INVENTORS:
Frederick M. Bender,
Charles W. Mooney and
Daniel C. Stahly,

BY Orr, Freeman & Molinare
ATTORNEYS.

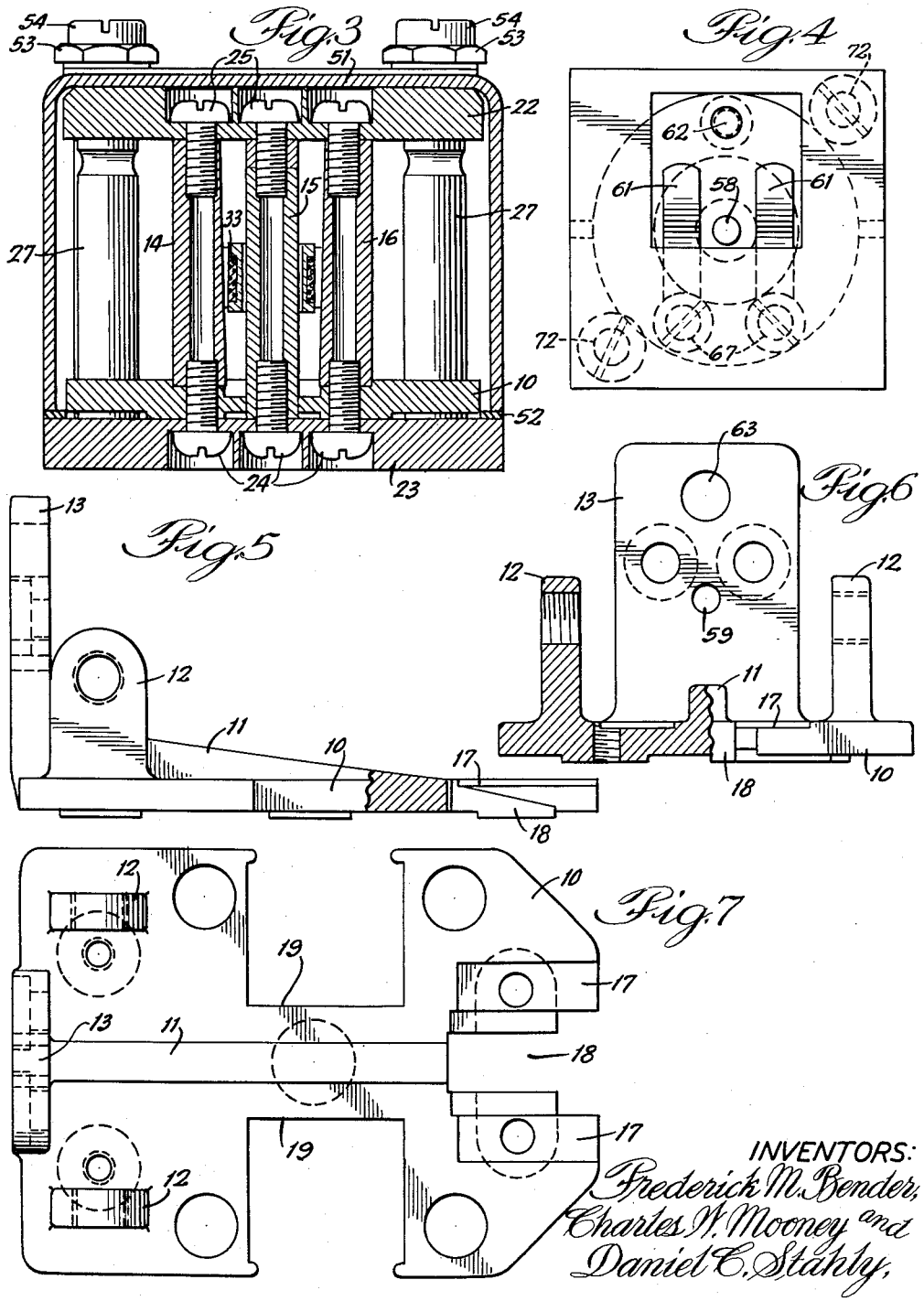

United States Patent Office 3,012,158
Patented Dec. 5, 1961

3,012,158
VIBRATION PICKUP HAVING A UNITARY POSITIONING FRAME
Frederick M. Bender, Chicago, Ill., Charles W. Mooney, West Palm Beach, Fla., and Daniel C. Stahly, Villa Park, Ill., assignors to Sun Electric Corporation, Chicago, Ill., a corporation of Illinois
Filed Apr. 15, 1960, Ser. No. 22,602
6 Claims. (Cl. 310—30)

This invention relates to vibration pickups and more particularly to a unit adapted to be mounted on a vibrating body and to produce an electrical voltage proportional to the vibration of the body.

In many types of testing and inspection work, it is necessary to measure the vibration of different devices or structural parts. For this purpose, it has been the practice to mount a vibration pickup on the device or part to produce an electrical voltage proportional to vibration thereof and to supply the voltage to an indicator at a convenient point. One type of pickup used for this purpose which has desirable characteristics is disclosed and claimed in the patent to Tyler et al., No. 2,443,969.

Such pickups as heretofore constructed have, however, been subject to certain difficulties of manufacture and assembly in order to obtain the desired degree of accuracy. For example, it has been difficult to assemble and to maintain the magnetic poles, magnets and moving coil structure in proper positions relative to each other. Another difficulty has been that of sealing the structure against ingress of moisture and other foreign materials which is necessary for certain types of use.

It is one of the objects of the present invention to provide a vibration pickup in which the various parts are easily assembled in accurate relationship to each other and are maintained in such relationship even under severe operating conditions.

Another object is to provide a vibration pickup which is so constructed as to be easily sealed against the ingress of moisture and other foreign materials.

According to a feature of the invention, the major parts of the pickup unit are all asembled on an integral nonmagnetic frame which may conveniently be a die casting. The frame and operating parts are covered by a cupped cover which seals against a magnetic bottom plate and against which an electrical connector is secured and sealed to enclose and seal all of the working parts.

According to another feature of the invention, the parts are held assembled by tubular studs or bolts sealed against the bottom plate and the cover and through which mounting screws extend for mounting the pickup on a device or part whose vibration is to be measured.

The above and other objects and features of the invention will be more readily apparent from the following description when read in connection with the accompanying drawings, in which:

FIGURE 3 is a transverse section through the magnetic core members;

FIGURE 4 is a view looking into the connector element;

FIGURE 5 is a side elevation of the unitary frame with parts broken away and in section;

FIGURE 6 is an end elevation of the frame with parts broken away and in section; and FIGURE 7 is a top plan view of the frame.

The pickup unit, as shown, comprises essentially a pivoted arm carrying a coil which is supported and movable in a magnetic field between adjacent magnetic pole members. The arm is supported to pivot freely so that when the framework on which the arm is mounted moves in response to vibrations, the arm will pivot causing the coil to move in the magnetic field and to generate in the coil electrical signals proportional in frequency and amplitude of the vibration. This general type of vibration pickup is known in the art and the present invention relates to improvements in the construction of the pickup to facilitate its assembly to maintain the several parts accurately in assembled position during use.

According to the present invention, the several operating parts of the pickup are assembled on a unitary frame, as shown in FIGURES 5, 6 and 7, which is of non-magnetic material and which may conveniently be a unitary die casting. The frame comprises a relatively flat base 10 reinforced by a central extending rib 11 extending lengthwise thereof and with a pair of upwardly projecting spaced ears 12 adjacent to one end thereof. An upwardly extending transverse plate 13 extends partially across said one end of the base for securing a connector thereto, as described more particularly hereinafter.

Figure 2:
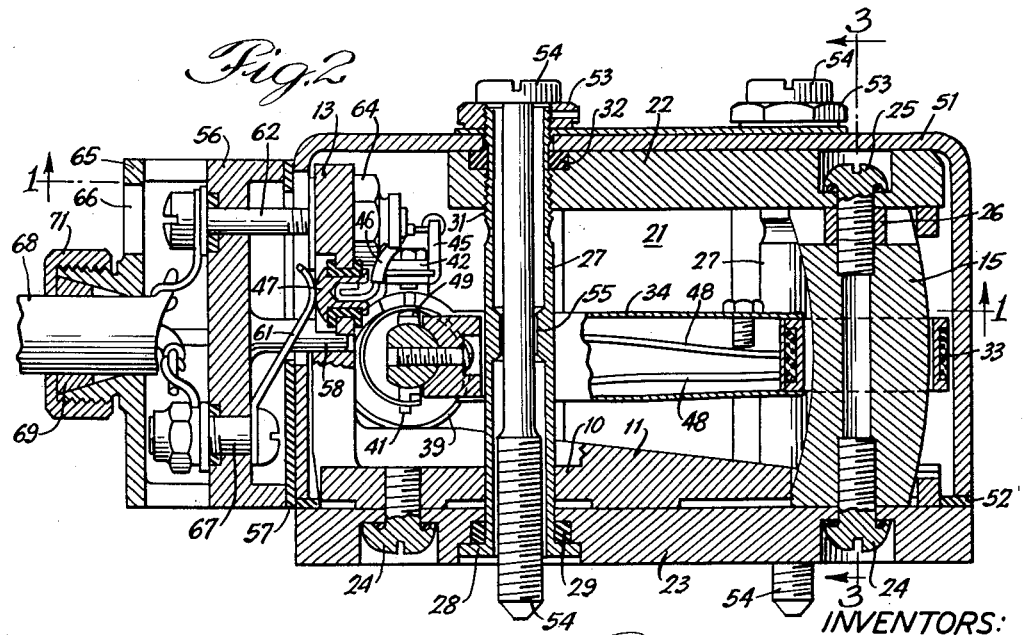
FIGURE 2 is a vertical sectional view through the pickup.

The base 10 is formed at its other end to receive the lower ends of three arcuate magnetic core elements 14, 15 and 16 which are mounted in parallel relationship and which are arcuately curved, as seen in FIGURE 2, about a center between the upper ends of the ears 12 and which defines the axis of pivotal movement of the coil supporting arm, as described hereinafter. As shown in FIGURE 7, the other end portion of the base is recessed at 17 on opposite sides of the longitudinal center line of the base to form recessed seats into which the lower ends of the outer magnetic core members 14 and 16 may seat. Between the seats 17 the base is formed with a slot 18 through which the lower end of the central core member 15 may project, as seen in FIGURES 2 and 3. Intermediate its ends the base is formed with a pair of rectangular openings 19 at opposite sides thereof defining locating openings for a pair of rectangular magnets 21. The magnets are of a size and shape to fit closely within the openings 19 so that the magnets will be accurately located and positioned by the base in the same manner as the core members are accurately located and positioned.

The magnetic circuit through the core members and magnets is completed by upper and lower magnetic plates 22 and 23, the lower plate 23 underlying the base and projecting laterally beyond the sides of the base, as seen in FIGURE 3. The core members are secured to the base and to the bottom plate 23 by means of screws 24, as seen in FIGURES 2 and 3. The center core member 15 directly contacts the bottom plate 23 and may be secured thereto conveniently by a steel screw or a screw of similar magnetic material while the outer core members 14 and 16 are spaced from the bottom plate by portions of the base 10 to define a non-magnetic gap. Preferably the outer core members are secured to the bottom plate and the base by non-magnetic screws formed of a material, such as brass.

The top plate 22 is similarly secured to the upper ends of the magnetic core members by means of screws 25. The upper ends of the outer core members 14 and 16 directly contact the top plate and may be secured thereto by steel screws or screws of similar magnetic material. The upper end of the center core member 15 is spaced from the top plate by a non-magnetic bushing 26 and the screw which screws it to the top plate is preferably of non-magnetic material, such as brass.

The magnets 21 are of a length to extend between and to engage the top and bottom magnetic plates at their opposite ends to create a magnetic circuit. The top plates and magnets are held assembled with respect to each other by tubular studs 27, as best seen in FIGURE 2. As shown, the studs 27 have heads 28 thereon which fit into recesses in the bottom plate 23 and are sealed against the bottom plate by annular seals 29. At their upper ends the studs have threaded portions 31 which are threaded directly into the top plate 22 to secure the plates together. The top plate 22 is preferably recessed around the studs to receive annular sealing members 32 whose purpose will appear more fully hereinafter.

Figure 1:
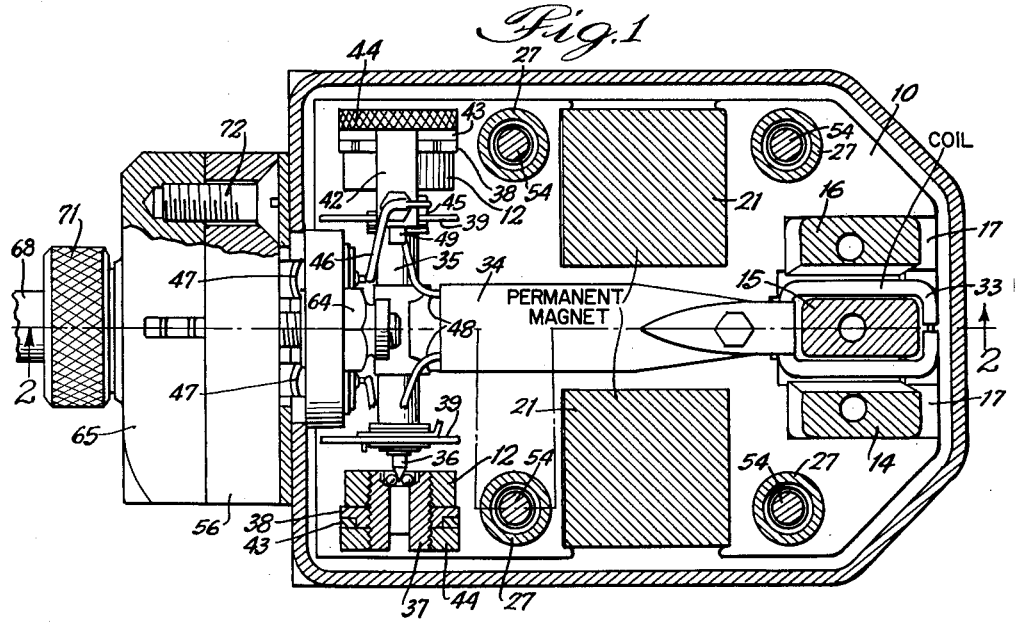
FIGURE 1 is a horizontal sectional view through a vibration pickup embodying the invention.

A magnetic coil 33 fits loosely around the central core member 15 and is adapted to be swung along the core member 15 in response to vibrations to be measured. For this purpose the coil is carried by an arm 34 which is supported on a cross shaft 35 pivoted in bearings carried by the ears 12. As best seen in FIGURE 1, the shaft 35 terminates at its ends in conical bearing members 36 which are rotatably supported by a series of bearing balls carried in a sleeve 37 threaded through an opening in an ear 12. The sleeve 37 is formed with a slot in its outer end to receive a screw driver, or the like, for adjustment of the bearing and may be held in place by a spanner nut 38 threaded onto the sleeve and engageable with the ear 12.

When the unit is used in a horizontal position to sense vibrations on a vertical plane, the weight of the arm and coil are balanced by coil springs 39 adjacent to the opposite ends of the shaft and acting in a direction to elevate the coil 33. As shown in FIGURE 2, one end of the coil spring is anchored as by soldering or welding to a bracket 41 secured to the shaft 35 in insulated relation thereto and the opposite end of each coil spring is secured to a mounting lug 42 carried by the adjacent ear 12. The mounting lug 42 is carried by a ring member 43 fitting over a projecting hub on the spanner nut 38 and gripped in place by a thumb nut 44 threaded onto the sleeve 37. By loosening the thumb nut, the tension of the springs can be adjusted to balance the arm and coil in a central position, as shown in FIGURE 2, and the lug 42 can then be clamped securely in place by tightening the thumb nut 44.

The end of the spring is gripped between the lug 42 and a connector lug 45 which is secured to the lug 42 by a bolt, as shown, and projects radially upward therefrom. The upper end of the lug 45 is connected through a lead 46 to a contact 47 extending through and insulated from the end wall 13 of the base. As shown in FIGURE 1, the structure described is duplicated at each side of the arm 34 with two contacts 47 horizontally spaced apart being exposed through the outer surface of the wall 13.

The coil is connected to the lugs 45 by means of wires 48 extending through the arm 34, which is preferably hollow, and extending out of the end of the arm adjacent to the pivot to be secured to connector lugs 49 which are integral with and on the opposite side of the shaft from the anchor lugs 41 for the spring. With this type of connection, the circuit for the coil is from one contact 47 through its connector lug 45, its spring 39 and one of the leads 48 to the coil with the return from the coil being through the corresponding elements at the opposite side of the arm to the other connector lug.

The operating parts, as so far described, are enclosed by a cup shaped cover 51 of a size and shape to fit over the top plate 22 and over the end plate 13 with its lower edge overlying and fitting against the edge portion of the bottom plate 23. An annular seal 52 is provided between the bottom plate and the edge of the cover to seal the space therebetween when the cover is drawn down against the bottom plate. To secure the cover in place, the tubular studs 27 are of a length to extend through the cover and to receive fastening nuts 53 which press the cover tightly against the bottom plate with the upper surface of the cover being pressed against the top plate and against the annular sealing members 32 to seal the space around the openings through which the mounting studs extend. The mounting studs also preferably receive mounting screws 54 which extend through and project beyond the studs for securing the pickup unit to a machine or part whose vibration is to be measured. Preferably, the screws 34 are of reduced diameter, except for the threaded portions thereof, to pass loosely through an internally threaded collar portion 55 in the tubular studs 27 so that the mounting screws are held captive and cannot accidentally be lost.

Electrical connections to the unit are established through a connector assembly secured to one end thereof and making contact with the contact members 47 through an opening in the end of the cover 51, as best seen in FIGURES 1 and 2. The connector assembly comprises a cup shaped housing 56 which fits against the end of the cover around the opening therein and which may be sealed against the cover by a resilient seal 57. The cup shaped member carries a central guide pin 58 which enters an opening 59 in the end plate 13 to locate the cover assembly accurately and has a pair of spring contact members 61 secured therein with their free ends positioned to engage the contacts 47 respectively when the connector assembly is mounted. To mount the connector assembly, a screw 62 extends through the top portion thereof above the guide pin 58 and passes through an opening 63 in the end wall 13 to be secured by a nut 64 which may be mounted on and secured to the end wall 13. When the screw 62 is drawn up tightly it will pull the cup shaped member 56 securely against the end of the cover 51 into sealing relation therewith and will bring the flexible contacts 61 into engagement respectively with the contacts 47.

The connector assembly is completed by a second cup shaped member 65 fitting against the outer surface of the cup shaped member 56 and formed with an opening 66 through which a screw driver may be extended to tighten the screw 62. The contacts 61 are carried by screws or studs 67 which are connected respectively to the two wires of a cable 68 which extends through an opening in the top of the member 65 and is wedged in place therein by an annular wedge element 69 and a gland nut 71. Preferably the cable 68 includes a grounded sheath which may be connected to the screw 62, as shown, to ground the frame of the pickup unit. With the connector screw in place, the space within the member 65 may be filled with a suitable sealing compound to prevent egress of moisture or foreign material to the contacts and leads, the remainder of the structure being sealed as described above.

The cup shaped members 56 and 65 are preferably secured together in assembled relationship by screws 72, as shown in FIGURES 1 and 4, which extend through corner portions of the cup shaped members outside of the circular recessed portions thereof.

With the present construction, it will be seen that all of the parts can be accurately and easily assembled on the unitary frame structure which, as indicated above, may be die cast from non-magnetic material with a high degree of accuracy. The base accurately locates the magnets, the magnetic core members and the pivotal mounting for the arm carrying the coil so that these parts are held very accurately positioned relative to each other even under severe conditions of use. The electrical connections can also be made quite easily through the construction described above and all of the functioning parts can be sealed against ingress of moisture or other foreign material which might interfere with proper operation.

While one embodiment of the invention has been shown and described herein, it will be understood that it is illustrative only and not to be taken as a definition of the scope of the invention, reference being had for this purpose to the appended claims.

What is claimed is:

1. A vibration pick-up comprising a unitary non-magnetic frame having a generally flat base and upwardly projecting ears adjacent to one end, the base being formed adjacent to its other end with three transversely spaced locating means for pole pieces, three arcuate pole pieces including a central pole piece having their lower ends engaging and located by the locating means and projecting upward from the base, the base being formed intermediate its ends and at its opposite sides with locating openings for magnets, magnets fitting through the last named openings at their lower ends and projecting upward from the base, top and bottom magnetic plates fitting against the ends of the magnets with the bottom plate underlying the base, fastening means securing said base to said bottom plate, one of the plates directly engaging the central pole piece at one end and the other plate directly engaging the side pole pieces at their other ends, an annular electric coil fitting movably around the center pole piece, and an arm pivotally mounted on said ears and carrying the coil for swinging movement along and around the center pole piece.

2. The vibration pick-up of claim 1 in which the base is formed with an opening through which the lower end of the center pole piece extends to engage the bottom plate with portions of the base lying between the lower ends of the side pole pieces and the bottom plate to form magnetic gaps.

3. The vibration pick-up of claim 1 further including an upwardly projecting transverse plate at said one end of the base, a pair of spaced terminals extending through said plate and terminating at the outer surface thereof in exposed contacts, flexible leads connecting said terminals to the coil, and a connector secured to the plate and including flexible contacts engaging said exposed contacts.

4. The vibration pick-up of claim 1 further including a cupped cover fitting over the top plate and frame and seating at its lower edge against the bottom plate, tubular bolts extending through the top of the cover and the bottom plate and sealed thereagainst, and mounting screws extending through the tubular bolts to mount the pick-up.

5. The vibration pick-up of claim 1 further including tubular bolts connecting the top and bottom plates and projecting above the top plate, a cupped cover fitting over the top plate and frame with openings in its top through which the upwardly projecting ends of the bolts project, nuts threaded on the upwardly projecting ends of the bolts and engaging the cover to press its lower edge against the bottom plate, and mounting screws extending through the tubular bolts to mount the pick-up.

6. The vibration pick-up of claim 1 further including an upwardly projecting transverse plate at said one end of the base, a pair of spaced terminals extending through said plate and terminating at the outer surface thereof in exposed contacts, flexible leads connecting said terminals to the coil, a cupped cover fitting over the top plate and frame with its lower edge sealingly engaging the bottom plate, elongated fastenings extending through and sealed against the top of the cover and the bottom plate, the cover having an opening therein at one end registering with the exposed contacts, a cupped connector fitting sealingly against the one end of the cover around the opening therein and including yielding contacts engaging the exposed contacts, and a tension fastening securing the connector to said transverse plate.

References Cited in the file of this patent

UNITED STATES PATENTS

| | | |
|---|---|---|
| 2,180,189 | Alvord | Nov. 14, 1939 |
| 2,443,969 | Tyler | June 22, 1948 |
| 2,798,972 | Booth | July 9, 1957 |